United States Patent [19]
Pate et al.

[11] Patent Number: 5,832,282
[45] Date of Patent: Nov. 3, 1998

[54] METHOD AND APPARATUS FOR IMPLEMENTING PROTECTED BATTERY HOT SWAPPING IN PORTABLE COMPUTERS

[75] Inventors: John Pate, Austin; Robert L. McMahan, Cedar Park, both of Tex.

[73] Assignee: Dell U.S.A., L.P., Austin, Tex.

[21] Appl. No.: 778,408

[22] Filed: Jan. 2, 1997

[51] Int. Cl.[6] .................................................. G06F 1/26
[52] U.S. Cl. ............................ 395/750.01; 395/750.08; 307/66
[58] Field of Search .................. 395/750.01, 750.08, 395/283; 307/66; 365/226; 361/683; 364/708.1

[56] References Cited

U.S. PATENT DOCUMENTS

| | | | |
|---|---|---|---|
| 4,648,066 | 3/1987 | Pitt | 361/684 |
| 5,028,806 | 7/1991 | Stewart et al. | 307/66 |
| 5,122,927 | 6/1992 | Satou | 361/683 |
| 5,220,520 | 6/1993 | Kessoku | 361/684 |
| 5,276,354 | 1/1994 | Link et al. | 307/66 |
| 5,309,031 | 5/1994 | Stewart et al. | 307/66 |
| 5,375,246 | 12/1994 | Kimura et al. | 365/229 |
| 5,519,871 | 5/1996 | Shimoda | 395/750.01 |
| 5,579,491 | 11/1996 | Jeffries et al. | 395/283 |
| 5,604,708 | 2/1997 | Helms et al. | 365/299 |

*Primary Examiner*—Gopal C. Ray
*Attorney, Agent, or Firm*—Haynes and Boone, L.L.P.

[57] ABSTRACT

Apparatus and method for insuring that a computer is in battery swap mode before a battery thereof is hot swapped by a user is described. A switch is located under the battery receptacle cover, which switch is actuated by the removal of the battery receptacle cover in an amount sufficient to expose the switch. Actuation of the switch generates a battery swap mode ("BSM") signal to the CPU, causing the computer to operate in battery swap mode, at which point the battery may be safely removed without risk of losing data stored in DRAM.

11 Claims, 1 Drawing Sheet

METHOD AND APPARATUS FOR IMPLEMENTING PROTECTED BATTERY HOT SWAPPING IN PORTABLE COMPUTERS

TECHNICAL FIELD

The invention relates generally to hot swapping of components in personal computers and, more particularly, to method and apparatus for enabling hot swapping of batteries that protect against data loss resulting therefrom.

BACKGROUND

Currently, most portable computers have batteries that are "hot swappable," meaning that the battery or batteries may be removed ("hot removal") and replaced ("hot replacement") without the user's having to turn off the computer. However, although the user need not turn off the computer, it is necessary for the user to cause the computer to enter a "battery swap mode" prior to swapping out the battery. As will be recognized by those skilled in the art, battery swap mode is a low power mode in which, typically, the computer's hard drive spins down, its LCD panel is turned off, and its CPU is placed in a low power, or sleep, mode. In addition, DRAM is refreshed by power from the backup or bridge battery, to preserve any data stored therein, while the main battery is removed. Typically, battery swap mode is invoked by entering a predetermined key sequence via the keyboard of the computer. Failure to enter battery swap mode prior to removing the battery will result in loss of data stored in DRAM, unless more than one battery is provided for supplying power to the computer.

Many users have more than one battery that they often swap while using their computer. Failure of a user to enter battery swap mode prior to hot swapping a battery can occur for several reasons. First, with the advent of multifunction peripheral bays, users often accidentally remove the battery when they intended to remove another peripheral, such as a CD-ROM drive, instead. Additionally, many novice users simply don't recognize the importance of insuring that data stored in DRAM is saved to a hard disk drive prior to removing power from the computer.

Therefore, what is needed is a means for insuring that a computer is caused to enter a battery swap mode before a battery thereof is hot swapped.

SUMMARY

In one embodiment, the present invention, accordingly, provides an apparatus and method for insuring that a computer is automatically placed in battery swap mode before a battery thereof is hot swapped by a user. In a preferred embodiment, the present invention includes a switch located under the battery receptacle cover, which switch is actuated by the removal of the battery receptacle cover in an amount sufficient to expose the switch. Actuation of the switch generates a battery swap mode ("BSM") signal to the CPU, causing the computer to operate in battery swap mode, at which point the battery may be safely removed without risk of losing data stored in DRAM.

A technical advantage is that it prevents a user from accidentally removing the battery of a computer without first placing the computer in battery swap mode.

A further technical advantage is that it automatically causes the computer to enter battery swap mode each time a user attempts to hot swap a battery thereof without any additional action by the user.

DESCRIPTION OF THE PREFERRED EMBODIMENT

Figure 1:
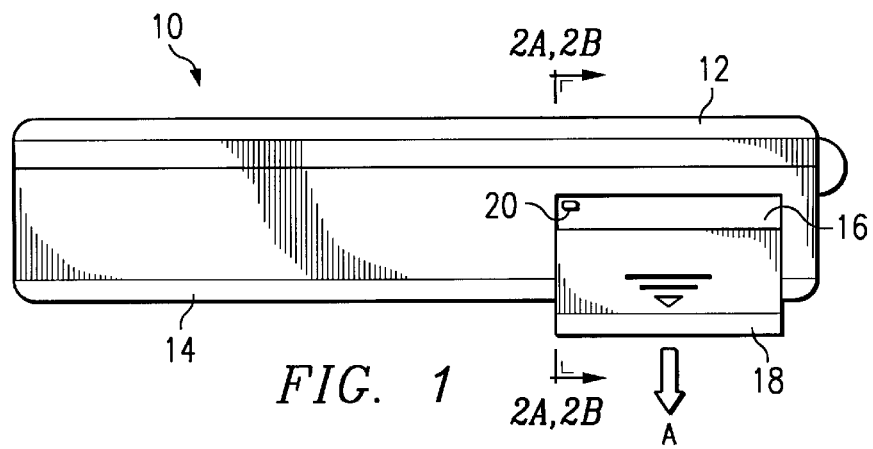
FIG. 1 is a side plan view of a portable computer embodying features of one embodiment of the present invention.

In FIG. 1, a portable computer is designated generally by a reference numeral 10 and includes a lid 12 and a base 14. A battery receptacle 16 for receiving a battery (not shown in FIG. 1) is disposed on the side of the base 14 and is covered by a removable receptacle cover 18. As shown in FIG. 1, the cover 18 has been partially removed by displacing it in a direction indicated by an arrow A to expose a switch 20, which in the illustrated embodiment is a mechanical switch. Continued displacement of the cover 18 in the direction indicated by the arrow A would result in complete removal of the cover from the receptacle 16, enabling the battery disposed therein to be removed.

Figure 2A:
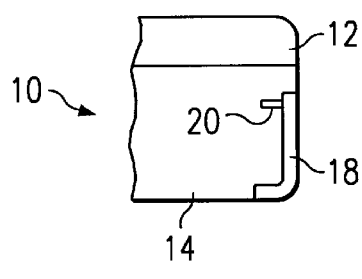
FIGS. 2A and 2B are partial cutaway views of the computer of FIG. 1 along the line II—II.
Figure 2B:
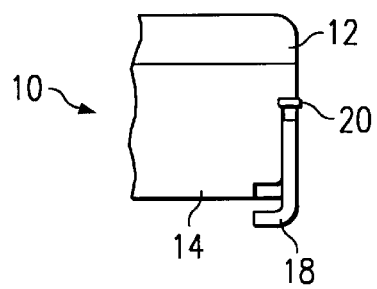

Referring to FIGS. 2A and 2B, it will be recognized that when the cover 18 is locked into place over the receptacle 16, as shown in FIG. 2A, the switch 20 will be depressed, or inactivated, such that the computer 10 operates normally. Conversely, when the cover 18 is partially removed from the receptacle 16, the switch 20 is actuated, thereby generating a BSM signal to the CPU (FIG. 3), as will be shown and described with reference to FIG. 3, causing the computer 10 to enter battery swap mode.

Figure 3:
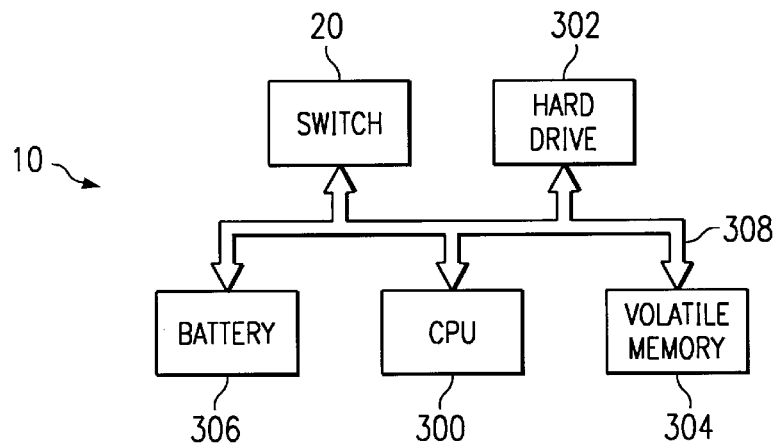
FIG. 3 is a system block diagram of the computer of FIG. 1.

Referring to FIG. 3, the computer 10 includes a central processing unit ("CPU") 300, a hard disk drive 302, DRAM 304, a battery, or battery pack, 306, and the switch 20 all interconnected via a bus 308. The CPU 300 is of a type which, upon receipt of a BSM signal, causes the computer 10 to enter battery swap mode, in which the hard disk drive 302 spins down, the computer's LCD panel (not shown) is turned off, and the CPU 300 is placed in a low power, or sleep, mode. In addition, the DRAM 304 is refreshed by power from the backup or bridge battery (not shown) to preserve any data stored therein, while the main battery 306 is removed.

In operation, when the computer 10 is on and the cover 18 is displaced in a downward direction in an amount sufficient to fully expose, and thereby actuate, the switch 20, the switch generates a BSM signal to the CPU 300 via the bus 308. Upon receipt of the BSM signal, the CPU 300 causes the computer 10 to enter battery swap mode, at which point the battery 306 can be safely removed from the receptacle 16. It will be recognized that the amount of time that elapses between the actuation of the switch 20 by partial removal of the cover 18 and the complete removal of the cover 18 is sufficient to enable the computer 10 to be placed in battery swap mode, such that battery 306 can be safely removed by the time the cover has been removed.

Although an illustrative embodiment of the invention has been shown and described, other modifications, changes, and substitutions are intended in the foregoing disclosure. For example, it will be recognized that any number of different types of switches may be used to implement the switch 20, such as mechanical, electrical, and electromechanical switches. Moreover, the inventive concepts taught herein can be utilized in connection with any computer having a battery which is removed in two steps, typically including a first step, in which the battery is "unlocked" to expose the battery, and a second step, in which the battery is actually removed, such as removal of a cover and subsequent removal of the battery. For example, the techniques described herein could also be implemented in computers that employ a switch that removes a lock so the battery or battery pack can be slid straight out of a multibay. In any case, the switch will be activated by the unlocking of the battery, thereby causing the computer to enter battery swap mode. In addition, it will be appreciated that the inventive concepts described herein could be used in connection with computer having a battery that is removed in a single step, i.e., there is not an "unlocking" step. For example, in the case of a battery pack having a connector, one or more short pins included on the connector, which disconnect before the remaining pins, could be used to signal impending removal of the battery pack, and hence initiate battery swap mode. Accordingly, it is appropriate that the appended claims be construed broadly and in a manner consistent with the scope of the invention.

What is claimed is:

1. A computer capable of preventing the accidental hot removal of a battery thereof while said computer is operating in a full power mode, the computer comprising:
   a processor;
   a memory electrically connected to said processor;
   a battery for providing power to said computer;
   a battery receptacle for retaining said battery within said computer;
   a cover for concealing said battery within said receptacle; and
   a switch disposed within said receptacle such that said switch is actuated by partial removal of said cover;
   wherein responsive to actuation of said switch, said computer is caused to operate in a battery swap mode.

2. The computer of claim 1 wherein said switch is an electro-mechanical switch, an electrical switch, or a mechanical switch.

3. In an electronic device capable of operating in a battery swap mode, an apparatus for automatically causing said electronic device to operate in battery swap mode before a battery for supplying power to said electronic device is hot swapped, the apparatus comprising:
   means for detecting impending removal of said battery; and
   means responsive to said detection for causing said electronic device to operate in said battery swap mode;
   wherein said means for detecting comprises a switch.

4. The apparatus of claim 3 wherein said switch is disposed on said electronic device such that it is automatically actuated when a user begins to remove said battery from said electronic device while said electronic device is on.

5. The apparatus of claim 3 wherein said battery is disposed within a battery receptacle concealed by a battery receptacle cover, said switch being disposed within said battery receptacle such that it is actuated by partial removal of said battery receptacle cover.

6. The apparatus of claim 3 wherein said switch is an electro-mechanical switch, an electrical switch, or a mechanical switch.

7. In a computer capable of operating in a battery swap mode, an apparatus for automatically causing said computer to operate in battery swap mode before a battery for supplying power to said computer is hot swapped, the apparatus comprising;
   a switch disposed on said computer such that it is automatically actuated whenever a user begins to remove said battery while said computer is on; and
   a battery receptacle for receiving said battery, said battery being concealed within said battery receptacle by a removable cover, and wherein said switch is disposed within said battery receptacle such that it is actuated by partial removal of said battery receptacle cover.

8. The apparatus of claim 7 wherein said switch is an electro-mechanical switch, an electrical switch, or a mechanical switch.

9. The apparatus of claim 7 wherein said switch generates a signal responsive to actuation thereof for causing said computer to operate in said battery swap mode.

10. In an electronic device capable of operating in a battery swap mode, a method of automatically causing said electronic device to operate in battery swap mode before a battery for supplying power to said electronic device is hot swapped, the method comprising:
    detecting impending removal of said battery;
    causing said electronic device to operate in said battery swap mode responsive to said detecting; and providing a switch on said electronic device, wherein said detecting impending removal of said battery comprises actuating said switch.

11. In an electronic device capable of operating in a battery swap mode, a method of automatically causing said electronic device to operate in battery swap mode before a battery for supplying power to said electronic device is hot swapped, the method comprising:
    detecting impending removal of said battery; and
    causing said electronic device to operate in said battery swap mode responsive to said detecting;
    wherein said battery is disposed within a battery receptacle concealed by a battery receptacle cover, the method further comprising providing a switch within said battery receptacle such that it is actuated by partial removal of said battery receptacle cover, said detecting impending removal of said battery further comprising removing said battery receptacle cover from said battery receptacle.

* * * * *